(12) United States Patent
Drescher

(10) Patent No.: US 8,665,935 B2
(45) Date of Patent: Mar. 4, 2014

(54) METHOD AND SYSTEM FOR CALIBRATING A TRANSMITTING SYSTEM

(75) Inventor: Wolfram Drescher, Dresden (DE)

(73) Assignee: NXP, B.V., Eindhoven (NL)

( * ) Notice: Subject to any disclaimer, the term of this patent is extended or adjusted under 35 U.S.C. 154(b) by 1073 days.

(21) Appl. No.: 12/097,096

(22) PCT Filed: Dec. 6, 2006

(86) PCT No.: PCT/IB2006/054618
§ 371 (c)(1),
(2), (4) Date: Jun. 12, 2008

(87) PCT Pub. No.: WO2007/069133
PCT Pub. Date: Jun. 21, 2007

(65) Prior Publication Data
US 2008/0298446 A1    Dec. 4, 2008

(30) Foreign Application Priority Data
Dec. 12, 2005  (EP) ..................... 05111990

(51) Int. Cl.
*H04B 1/62* (2006.01)
(52) U.S. Cl.
USPC ....................... 375/224; 455/115.1
(58) Field of Classification Search
USPC ....................... 375/224; 455/115.1
See application file for complete search history.

(56) References Cited

U.S. PATENT DOCUMENTS

| 6,925,112 | B1* | 8/2005 | Morejon et al. | 375/222 |
| 7,457,350 | B2* | 11/2008 | Baker et al. | 375/147 |
| 2002/0135683 | A1* | 9/2002 | Tamama et al. | 348/222 |
| 2004/0203472 | A1* | 10/2004 | Chien | 455/68 |
| 2005/0136868 | A1 | 6/2005 | Jun et al. | |
| 2006/0061501 | A1* | 3/2006 | Sheng et al. | 341/155 |
| 2007/0076818 | A1* | 4/2007 | Barnes et al. | 375/316 |

FOREIGN PATENT DOCUMENTS

EP    1331742 A2    7/2003

\* cited by examiner

*Primary Examiner* — Shuwang Liu
*Assistant Examiner* — David Huang

(57) ABSTRACT

The invention relates to a method and a system for calibrating a transmitting system (1) for transmitting data from a medium access control device (2) via a digital interface (IF1) to a physical layer (PHY) and an antenna (3) to a transmission line (4), wherein the physical layer (PHY) comprises a base band controller (5) and a data processing pipeline (6) comprising a plurality of functional blocks (FB1 to FB13), comprising the following steps:
  setting a calibration control register (R),
  thereupon, setting the transmitting system (1) to a calibration mode, wherein the transmitting system (1) generates a predetermined number of single test tones (T) and transmits the test tones (T) sequentially, and
  after transmission of the test tones (T), detecting the returned test tones (T) and measuring their levels, especially their power levels and the spectrum behavior of the transmission line (4).

20 Claims, 2 Drawing Sheets

METHOD AND SYSTEM FOR CALIBRATING A TRANSMITTING SYSTEM

The invention relates to a method and a system for calibrating a transmitting system for transmitting data from a medium access control device via a digital interface to a physical layer and to an antenna to a transmission line, wherein the physical layer comprises a base band controller and a data processing pipeline comprising a plurality of functional blocks.

Transmitting systems having such features are used in particular in communication devices (also called UWB transmitter, with UWB=ultra-wide band). The transmitting systems are part of a transceiver, such as of an ultra-wide band transceiver which could be integrated in several electronic devices such as in pocket PCs, in mobile phones, in digital cameras, etc.

Modern communication or transmitting systems are based on digital signal processing technology. Such communication systems can transmit and receive signals. The spectrum behaviour in the transmission line are different. In order to transmit and receive signals accurately, system interference should be reduce, system transmitting capacity should be increase, system transmitting power should be decrease and the receiving sensitivity should be improve.

Furthermore, as the characteristics of electronic elements, especially active elements, differ from each other, the sensitivities thereof to operation frequency and ambient temperature are different and the changes in the characteristics of every transmitting and receiving path or link due to the reason above are different, the system calibration should be carried out periodically.

Normally, when making calibration in a known communication system, the communication system works in a calibration mode. The calibration is carried out by using an additional sine wave generator to generate test signals or test tones at a given frequency. The test signals are transmitted and received by the communication system. The levels of all transmitting and receiving test signals are measured and the ratios of amplitudes of receiving and transmission signals are determined. This is a general scheme of a method for calibrating.

The technical specification of an UWB communication system does not explicitly state out requirements for transceiver's calibration. However, it is commonly known, that those communication devices need to be calibrated before use.

A known method for calibration of a transmitter analog front end device is the spectrum behaviour or flatness calibration. The transmitter transmits a set of test tones by same time receiving them on the receiver circuit. From the measured power one can derive information of linearity etc. of the transmitter circuit and later on can use this information for balancing bands of the spectrum by different attenuation for different bands of the device under calibration. The concept used for this kind of calibration is based on transmission of one single continuous tone at a time.

In contrast, the UWB communication device transmits a set of superimposed tones, which are divided in time by zero padded gaps. Therefore, currently UWB communication devices either have no spectrum flatness calibration implemented or the test-tones will be generated by a separate tone generator circuit attached directly to the analog front end. The invention proposes a transmitter architecture needing no extra effort for performing a spectrum flatness calibration.

It is an object of this invention to specify a method and a system for calibrating a transmitting system for transmitting data from a medium access control device via a digital interface to a physical layer and to an antenna, by which it is possible to calibrate the transmitting system periodically without additional hardware components.

The problem is solved by a method and a system described below.

Advantageous embodiments of the invention are given in the respective dependent claims.

According to the invention a method for calibrating a transmitting system for transmitting data from a medium access control device via a digital interface to a physical layer and an antenna and to a transmission line, wherein the physical layer comprises a base band controller and a data processing pipeline comprising a plurality of functional blocks, comprising the following steps:

setting a calibration control register, thereupon, setting the transmitting system to a calibration mode, wherein the transmitting system generates a predetermined number of single test tones and transmits the test tones sequentially, and after transmission of the test tones, detecting the returned test tones and measuring their levels, especially their power levels and the spectrum behaviour of the transmission line.

Such generation of test tones by using the transmitting system itself is a simple way to generate and control test tones. Costs for an internal or an additional external implementation of additional hardware, i.e. of a sine wave generator, can be saved this way. In other words: The transmitting system is reuse for measuring the spectrum behaviour of the transmission line. Since the transmitting system works only in a calibration mode and no additional hardware components are necessary, the power consumption is higher than in conventional transmitting systems.

To measure the spectrum behaviour of the whole transmission line with a bandwidth of 528 MHz, the single test tones are generated with predetermined different frequencies in the relevant 528 MHz-band. To measure the spectrum behaviour of a whole transmit channel with a number of 528 MHz-bands over 1 GHz, a single test tone is used for one band. Advantageously, one single test tone is transmitted sequentially in different 528 MHz-bands. In particular, the transmission line or channel is measured and calibrated cyclically, e.g. each 100 ms, or at a predetermined situation.

In a further embodiment of the present invention, the measured level of the returned test tones is used to calibrate the transmission line. Preferably, the base band controller measures the level of the different test tones and sets a proper scaling factor for different transmitting tones in the transmission line.

In an advantageous embodiment, one of the functional blocks is used as a tone generator. Preferably, a FFT functional block is adjusted to select only one tone and to generate an output signal in a single tone mode. In such an embodiment, single tones are selected from the spectrum of superimposed tones in the frequency domain and are transmitted sequentially, e.g. a first, a tenth and a twentieth tone are selected and transmitted sequentially.

In a sophisticated alternative embodiment of the present invention, the predetermined pilot tones are used as single test tones. This is a simple control and generation of test tones; thereof already existing pilot tones are used. Only one of the 12 pilot tones is selected; the other pilot tones are suppressed.

In an alternative sophisticated embodiment, a preamble functional block is set to the calibration mode, where it repeats the transmission of a single frame endlessly. If the generation of test tones should include all 128 possible tones, the pilot tones included in this frame will be used as stimulus.

In another sophisticated embodiment, the medium access control device initializes a zero frame transmission or a transmission of a frame, whose length is correlated with the tone measurement time length. The length of the transmitted frame is long enough to fulfill the time for a tone measurement. Especially, 77 µs to 242 µs is the maximum length of a frame in the transmission line or in the air, e.g. 242 µs with a bandwidth of 528 MHz and 128 test tones.

Advantageously, during the spectrum calibration mode of the transmitting system, a suffix space insertion is deactivated. In particular, a suffix space insertion functional block suppresses all tones except the actual test tone.

The technical solution to achieve the object of this invention includes a system for calibrating a transmitting system for transmitting data from a medium access control device via a digital interface to a physical layer and an antenna and to a transmission line, wherein the physical layer comprises a base band controller and a data processing pipeline comprising a plurality of functional blocks, comprising the following steps:

the medium access control device sets a calibration control register, thereupon, the transmitting system is set to a calibration mode, wherein the transmitting system generates a predetermined number of single test tones and transmits the test tones sequentially, and after transmission of the test tones, the transmitting system detects the returned test tones and measures their levels, especially their power levels and the spectrum behaviour of the transmission line.

In said transmitting system, advantageously the base band controller measures the level of the different test tones and sets a proper scaling factor for different transmitting tones in the transmission line.

Preferably, one of the functional blocks is used as a tone generator. In a sophisticated embodiment, a FFT functional block is adjusted to select a test tone and to generate an output signal in a single tone mode. A separate external wave generator is not necessary in this case.

Alternatively, a preamble functional block is set to the calibration mode, where it repeats the transmission of a single frame endlessly.

In another preferred embodiment of the transmitting system, the medium access control device initializes a zero frame transmission or a transmission of a frame, whose length is correlated with the tone measurement time length.

The present invention has the advantages of a simple hardware by reusing the existing components and a simple control. It is especially useable for a communication system with high chip rate. Although, the above solution is proposed for transmitting system in communication devices, especially for an UWB transmitter.

In the following, the invention is explained in further detail with a drawing.

FIG. 1 shows a general block diagram of an ultra-wide band transmitter 1 (further shortly called "transmitter 1").

Figure 1:
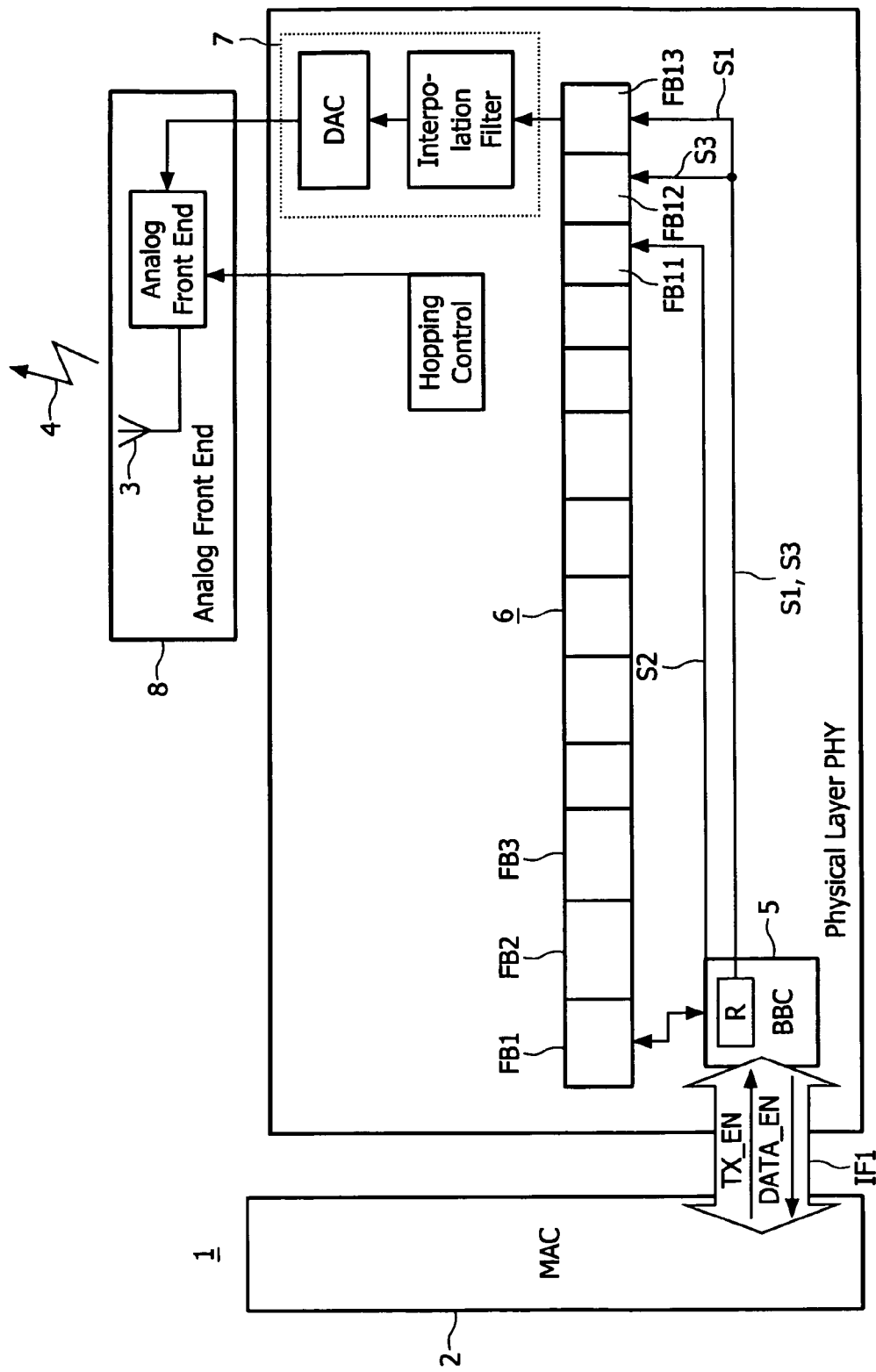
FIG. 1 shows a block schematic diagram of the architecture of a device with a medium access control device, coupled through a digital interface (also called MAC-PHY interface) to the physical layer and to an antenna. The device may operate as a communication device, e.g. as a UWB device.

The transmitter 1 or a transmitting system is used in particular in radio communication devices (also called UWB transmitter, with UWB=ultra-wide band). The transmitter 1 could be part of a transceiver, such as of an ultra-wide band transceiver which could be integrated in several electronic devices such as in pocket PCs, in mobile phones, in digital cameras, etc.

The transmitter 1 transfers data from a medium access control device 2 via a digital interface IF1 to a physical layer PHY and to an antenna 3 into a transmission line 4. The physical layer PHY comprises a base band controller 5 and a data processing pipeline 6 comprising a plurality of functional blocks FB1 to FB13. Basically, all functional blocks FB1 to FB13 processing data in the time domain or in frequency domain may be shifted from time domain into frequency domain and vice versa. For instance, the functional blocks FB1 to FB10 work in the frequency domain; the functional blocks FB11 to FB13 after the fast Fourier transformation functional block FB10 (shortly called FFT functional block) work in the time domain.

In a normal operation mode, the data are in particular transmitted from the medium access control device 2 via the parallel interface part of the digital or so called MAC-PHY interface IF1 to the physical layer PHY and through the data processing pipeline 6 comprising the plurality of functional blocks FB1 to FB13 to the antenna 3. When a packet is transmitted, it always starts with a transmission of a preamble to the antenna 3, which is created by a preamble functional block FB12 in the data processing pipeline 6.

As a general rule, in single frame transmission mode the timing control is performed in the base band controller 5 of the physical layer PHY. The medium access control device 2 initiates a single frame transmission via the serial interface part of the digital interface IF1 by setting a command signal "TX_EN", which is denoted by TX_EN. Usually, the base band controller 5 is triggered by this event and starts transmission of the preamble immediately by utilising a start preamble signal which connects the base band controller 5 and the preamble block FB12.

The preamble of the preamble block FB12 is a fixed sequence stored in preamble memory 6 and hence does not have to be encoded by the other transmit path functional blocks FB1 to FB11. Thus, a transmit encoder of the physical layer PHY has enough time to fill its data processing pipeline 6 during preamble transmission until the encoded data signal reaches the preamble block FB12. When the preamble transmission is completed, the encoded header and payload data has to be transmitted to the antenna 3 via a high-speed digital front-end 7 and a radio frequency subsystem 8 (shortly called analog front-end).

The invention relates to a method for calibrating the transmitter 1. The method is described in more detail as follows:

In general, the medium access control device 2 sets a calibration control register R. Thereupon, the transmitter 1 is set to a calibration mode. To calibrate the transmitter 1, there are following different sophisticated embodiments:

If the register R is set, the transmitter 1 should behave the same as in "Normal transmit mode", but the "Zero Suffix Insertion" functional block FB13 is disabled. In other words: For all different embodiments, with setting the transmitter 1 to the calibration mode, a first signal S1 turn off zero padded suffix insertion.

In a first embodiment, the transmitter 1 performs e.g. 12 test tones T at different frequencies, transmitted sequentially without a suffix space and detected by a level detector of the transmitter 1. Then the level, especially the receive power level is measured before it is fed back through the digital interface IF1 to the medium access control device 2. The digital interface IF1 measures the power level of the received different test tones T and sets proper scaling factors for different transmitting tones in the data processing pipeline 6 to adjust the spectrum behaviour in the transmission line 4.

Figure 2:
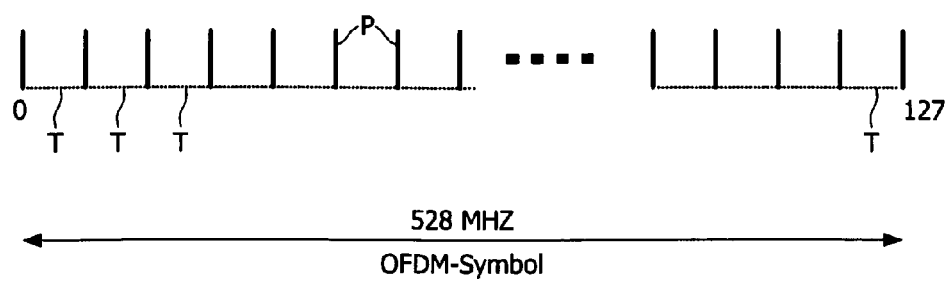
FIG. 2 shows selection of a number of test tones.

FIG. 2 shows a possible first embodiment for selection test tones T. A number of test tones T are generated with predetermined different frequencies. In more detail, each fourth tone of 128 tones in a 528 MHz-band is selected as test tones T. Alternatively, 12 tones of 128 tones could be selected as test tones T in the data processing line for a transmitting band with a bandwidth of 528 MHz. The single test tones T are selected in the frequency domain. For the selection, an additional functional control block could be implemented. Alternatively, the selection function could be integrated in one of the functional blocks FB1 to FB10 in the frequency domain.

In a second embodiment, predetermined pilot tones P are used as test tones T. In this embodiment, a second signal S2 (see FIG. 1) of the base band controller 5 configures the symbol shaping functional block FB11 for passing of one single pilot P at a predetermined time. This single pilot tone P is spread over the whole frequency spectrum; the other pilot tones are suppressed.

In a third embodiment, the FFT functional block FB10 is adjusted to select only one single tone and to generate an output signal as a test tone T in a single tone mode. In detail, the FFT functional block FB10 amplifies the single test tone T with high amplitude at the output.

In a further embodiment, a third signal S3 is set to repeat the preamble with predetermined tones. In particular, the preamble module inside the preamble functional block FB12 is set into a mode, where it repeats the transmission of a single frame endlessly. The pilot tones P included in this frame are used as stimulus. If the generation of test tones T should include all 128 possible tones, the preamble block needs to generate a separate stimulus pattern for this case.

In a further alternative embodiment, the medium access control device 2 initializes a zero frame transmission or a transmission of a frame, whose is long enough to fulfill the time for a tone measurement, e.g. 77 μs is the maximum length of a frame in the transmission line.

The measurement of the level of the received test tones T and the adjustment of the spectrum behaviour in the transmission line 4 is equal in all described embodiments to the method according to the first embodiment.

For calibrating the transmission line or channel, the measurement and the adjustment is done cyclically, e.g. each 100 ms, or at a predetermined condition.

Figure 3:
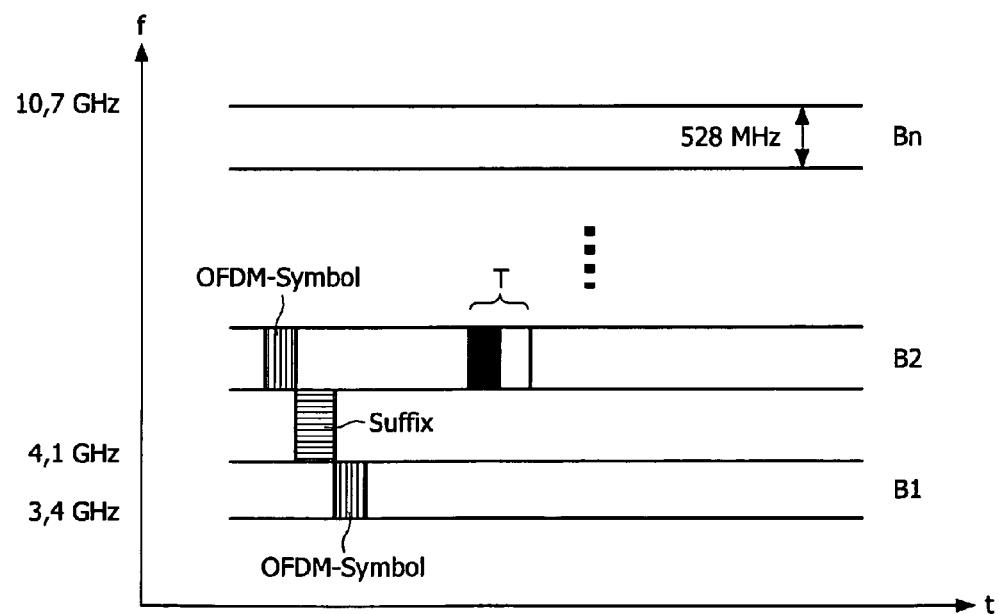
FIG. 3 shows measurement of a single band with a single test tone.

FIG. 3 shows the measurement of the spectrum behaviour, especially of the spectrum flatness of the whole transmit channel with a number of bands B1 to Bn.

In the normal operation of the transmitting system, an "OFDM-symbol" is transmitted in different bands B1 to B2 with a suffix space insertion "Suffix" between two "OFDM-symbols" and two bands B1 and B2 (see the lined boxes). For the calibration mode, this suffix space insertion and the band hopping are deactivated.

In the calibration mode of the transmitter 1, a single test tone T is transmitted only in one band B2 with a predetermined time (see the black boxes). Only this band B2 is measured with the single test tone T. For calibrating each band B1 to Bn, a single test tone T is transmitted sequentially in different bands B1 to Bn. The selection of the relevant band B1 to Bn, e.g. how long, which band B1 to Bn, is done by a controller of the radio frequency subsystem 8 or by the base band controller 5 or by one of the functional blocks FB1 to FB13.

The implementation of the method for calibrating the transmitter 1 in different bands B1 to Bn is explained in further detail with a possible embodiment as follows:

The spectrum behaviour calibration has to be initiated by a higher level application through the medium access control device 2. Consecutively following steps apply:

The medium access control device 2 set the calibration mode. In order to do so, the base band controller 5 needs the information that sets the calibration mode. For this reason the base band controller 5 contains a vendor specific control register R, which is set by the medium access control device 2. If the register R is set, the transmitter 1 should behave the same as in "Normal transmit mode". In other words: The transmitter 1 is used for calibrating itself.

The difference in spectrum flatness calibration according to the above described invention compared to "Normal transmit mode" is that the data processing pipeline 6 is not supposed to insert the zero padded suffix. Hence, the base band controller 5 has a connection to the "Zero Suffix Insertion" functional block FB13 that may disable zero suffix insertion by the first signal S1. In other words: The base band controller 5 adjusts the functional block FB13 not to insert zero padded suffix spaces.

Thereupon, the base band controller 5 configures the functional block FB11 for suppression of all tones (multiply by coefficient '0'), except the test tone T, which could be one of the 12 pilot tones P. Alternatively, the medium access control device 2 configures the functional block FB11 for selecting one single test tone T.

The medium access control device 2 initializes a zero frame transmission.

The radio frequency subsystem 8 measures the power of the spectrum and stores the value in a register.

The medium access control device 2 reads the register from radio frequency subsystem 8.

The medium access control device 2 repeats the above mentioned steps in a predetermined number of times, e.g. 12 times in total for all 12 pilot tones P, for a predetermined number of bands B1 to Bn.

LIST OF NUMERALS 1 transmitting system
2 medium access control device
3 antenna
4 transmission line
5 base band controller
6 data processing pipeline
7 high speed digital front-end
8 radio frequency subsystem
B Band
FB1 to FB13 functional blocks
P pilot tone
R calibration control register
S1 to S3 control signals
T test tone

The invention claimed is:

1. A method for calibrating a transmitting system for transmitting data from a medium access control device via a digital interface to a physical layer and an antenna to a transmission line, wherein the physical layer comprises a base band controller and a data processing pipeline comprising a plurality of functional blocks, comprising the following steps:
setting a calibration control register,
thereupon, setting the transmitting system to a calibration mode based on the setting of the calibration control register, wherein the transmitting system generates a predetermined number of single test tones and transmits the test tones sequentially via the antenna, and after transmission of the test tones via the antenna, detecting signals that are returned in response to the transmitted test tones and measuring their power levels and the spectrum behaviour of the transmission line, wherein the method comprises initializing a zero frame transmission or a transmission of a frame, whose length is correlated with a tone measurement time length of the single test tone, using the medium access control device.

2. The method according to claim 1, wherein the single test tones are generated with predetermined different frequencies to measure the spectrum behaviour of the transmission line.

3. The method according to claim 1, wherein predetermined pilot tones are used as the single test tones.

4. The method according to claim 1, wherein the measured levels of the signals that are returned in response to the transmitted test tones are used to calibrate the transmission line.

5. The method according to claim 1, wherein the base band controller measures the level of the signals that are returned in response to the transmitted test tones and sets a proper scaling factor for different transmit tones in the transmission line.

6. The method according to claim 1, wherein one of the functional blocks is used as a tone generator.

7. The method according to claim 1, wherein a FFT functional block is adjusted to generate an output signal in a single tone mode.

8. The method according to claim 1, wherein a preamble functional block is set to the calibration mode, where it repeats the transmission of a single frame endlessly.

9. The method according to claim 1, wherein during the calibration mode of the transmitting system, a suffix space insertion is disabled based on the setting of the calibration control register.

10. The method according to claim 9, wherein all tones are suppressed except the actual test tone.

11. A system for calibrating a transmitting system for transmitting data from a medium access control device via a digital interface to a physical layer and an antenna to a transmission line, wherein the physical layer comprises a base band controller and a data processing pipeline comprising a plurality of functional blocks, the system comprising:
    a medium access control device configured to set a calibration control register,
    a physical layer module; and
    an analog front end;
    wherein the physical layer module is configured to set a transmitting system to a calibration mode based on the setting of the calibration control register, wherein the transmitting system generates a predetermined number of single test tones and transmits the test tones sequentially via the antenna, and
    wherein after transmission of the test tones via the antenna, the transmitting system detects signals that are returned in response to the transmitted test tones and measures their power levels and spectrum behaviour of the transmission line, wherein the medium access control device initializes a zero frame transmission or a transmission of a frame, whose length is correlated with a tone measurement time length of the single test tone.

12. The system according to claim 11, wherein the base band controller measures the level of the signals that are returned in response to the transmitted test tones and sets a proper scaling factor for different transmit tones in the transmission line.

13. The system according to claim 11, wherein one of the functional blocks is used as a tone generator.

14. The system according to claim 11, wherein a FFT functional block is adjusted to generate an output signal in a single tone mode.

15. The system according to claim 11, wherein a preamble functional block is set to the calibration mode, where it repeats the transmission of a single frame endlessly.

16. The system according to claim 11, wherein during the calibration mode of the transmitting system, a suffix space insertion is deactivated based on the setting of the calibration control register.

17. The system according to claim 16, wherein a suffix space insertion functional block suppresses all tones except the actual test tone.

18. A method for calibrating a transmitting system for transmitting data from a medium access control device via a digital interface to a physical layer and an antenna to a transmission line, wherein the physical layer comprises a base band controller and a data processing pipeline comprising a plurality of functional blocks, comprising the following steps:
    setting a calibration control register,
    thereupon, setting the transmitting system to a calibration mode based on the setting of the calibration control register, wherein the transmitting system generates a predetermined number of single test tones and transmits the test tones sequentially via the antenna, and
    after transmission of the test tones via the antenna, detecting signals that are returned in response to the transmitted test tones and measuring their power levels and the spectrum behaviour of the transmission line, wherein during the calibration mode of the transmitting system, a suffix space insertion is disabled based on the setting of the calibration control register.

19. The method of claim 18, wherein all tones are suppressed except the actual test tone.

20. A system for calibrating a transmitting system for transmitting data from a medium access control device via a digital interface to a physical layer and an antenna to a transmission line, wherein the physical layer comprises a base band controller and a data processing pipeline comprising a plurality of functional blocks, the system comprising:
    a medium access control device configured to set a calibration control register,
    a physical layer module; and
    an analog front end;
    wherein the physical layer module is configured to set a transmitting system to a calibration mode based on the setting of the calibration control register, wherein the transmitting system generates a predetermined number of single test tones and transmits the test tones sequentially via the antenna, and
    wherein after transmission of the test tones via the antenna, the transmitting system detects signals that are returned in response to the transmitted test tones and measures their power levels and spectrum behaviour of the transmission line, wherein during the calibration mode of the transmitting system, a suffix space insertion is deactivated based on the setting of the calibration control register.

* * * * *